United States Patent [19]
Naiman et al.

[11] Patent Number: 5,110,874
[45] Date of Patent: May 5, 1992

[54] METHODS AND COMPOSITIONS FOR REDUCTION OF DRAG IN HYDROCARBON FLUIDS

[75] Inventors: Michael I. Naiman, St. Louis; James C. Chang, Manchester, both of Mo.

[73] Assignee: Petrolite Corporation, St. Louis, Mo.

[21] Appl. No.: 510,929

[22] Filed: Apr. 19, 1990

Related U.S. Application Data

[62] Division of Ser. No. 381,232, Jul. 18, 1989, Pat. No. 4,983,186.

[51] Int. Cl.$^5$ .............................................. C08F 8/32
[52] U.S. Cl. ................... 525/329.9; 525/381; 525/382
[58] Field of Search ..................................... 525/329.9

[56] References Cited

U.S. PATENT DOCUMENTS

| | | | |
|---|---|---|---|
| 3,471,460 | 10/1969 | Rees | 525/329.9 |
| 3,567,678 | 3/1971 | Kalopissis | 525/329.9 |
| 3,647,731 | 3/1972 | Clough | 525/329.9 |
| 4,139,689 | 2/1979 | Hochreuter et al. | 525/329.9 |
| 4,870,137 | 9/1989 | Lopez et al. | 525/329.9 |

FOREIGN PATENT DOCUMENTS 82-050023 10/1983 Japan .

*Primary Examiner*—Bernard Lipman
*Attorney, Agent, or Firm*—Jeffrey S. Boone; Kenneth Solomon

[57] ABSTRACT

A method for reducing friction loss in flowing hydrocarbon fluids is disclosed. The method comprises adding to the fluid an effective amount of an oil-soluble polyamine and a terpolymer of styrene, alkyl acrylate and a carboxylic acid selected from the group consisting of acrylic acid and methacrylic acid. Related compositions are also disclosed.

14 Claims, No Drawings

METHODS AND COMPOSITIONS FOR REDUCTION OF DRAG IN HYDROCARBON FLUIDS

This application is a division of application Ser. No. 07/381,232, filed 1989 July 18, now U.S. Pat. No. 4,983,186.

BACKGROUND OF THE INVENTION

1. Field of the Invention

The present invention relates to pressure loss as a result of friction in the flow of hydrocarbon fluids through conduits, and more particularly to additives for reduction of friction encountered in the flow of hydrocarbon fuels through conduits.

2. Description of the Prior Art

Hydrocarbon fuels are often transported by conduit over vast distances. For example, crude oil extracted from Alaskan reserves is piped many miles en route to refineries. As with friction related to the transport through conduits of any fluid, friction encountered in pumping of hydrocarbon fluids through conduits such as pipelines results in pressure drop along the length of the conduit. Moreover, at the high volumetric flow rates desired for transport of the hydrocarbon fuels, laminar flow tends to give way to highly turbulent flow, resulting in even greater friction related pressure loss. Thus, large amounts of additional energy must be expended to overcome the drag inherent in the flow of the fuel through the pipeline.

Accordingly, certain techniques have been employed in attempts to reduce the frictional drag encountered in transportation of hydrocarbon fuels. For example, as illustrated by U.S. Pat. No. 4,625,745, U.S. Pat. No. 3,748,266, U.S. Pat. No. 3,758,406 and U.S. Pat. No. 3,654,994, various agents for reducing friction have been added to hydrocarbon fluids. Typically, these agents alter the characteristics of the fluid so that at the fluid velocity which otherwise produced highly turbulent flow, produces less turbulent or laminar flow. Thus, pressure loss due to friction during transport of the fluid through conduits is reduced.

Nevertheless, conventional friction reduction agents have been found to suffer several drawbacks. For example, although effectiveness of the agents generally increases with increased molecular weight of the agents, the hydrocarbon or oil solubility of the agent characteristically decreases with higher molecular weight. Thus, either relatively less effective agents or lower concentrations of relatively more effective agents can be used, and so the efficacy of conventional agents is limited. Moreover, agents such as described in U.S. Pat. No. 3,654,994 often require special handling and equipment, are relatively expensive and are available generally only in relatively dilute forms, i.e., about 5% active mixtures.

SUMMARY OF THE INVENTION

Briefly, therefore, the present invention is directed to a novel method for reducing friction loss in flowing hydrocarbon fluids. The method comprises adding to the fluid an effective amount of an oil-soluble polyamine and a terpolymer of styrene, alkyl acrylate and acrylic acid or methacrylic acid.

The present invention is also directed to a salt useful for reducing friction loss in flowing hydrocarbon fluids. The salt is formed by the ionic reaction between an oil-soluble polyamine and a terpolymer of styrene, alkyl acrylate and a carboxylic acid selected from the group consisting of acrylic acid and methacrylic acid.

The present invention is further directed to a hydrocarbon fluid having reduced drag during flow of the fluid through conduits. The fluid comprises a hydrocarbon fluid and a salt formed by the ionic reaction between an oil-soluble polyamine and a terpolymer of styrene, alkyl acrylate and a carboxylic acid selected from the group consisting of acrylic acid and methacrylic acid.

Among the several advantages found to be achieved by the present invention, therefore, may be noted the provision of a friction reduction agent that has sufficient molecular weight to be effective, yet is soluble in hydrocarbons; the provision of such agent that does not require special handling techniques or equipment; the provision of such agent that is relatively inexpensive; and the provision of such agent that is available in relatively concentrated form.

DESCRIPTION OF THE PREFERRED EMBODIMENTS

In accordance with the present invention, it has been discovered that adding to a hydrocarbon fluid an effective amount of an oil-soluble polyamine and a terpolymer of styrene, alkyl acrylate and either acrylic acid or methacrylic acid substantially reduces friction loss during flow of the fluid through conduits.

Generally, as noted above, it has been found that the effectiveness of polymers employed as drag reducing agents in hydrocarbon fluids increases with the molecular weight of the polymer. Thus, it is preferred that the polymer have a very high molecular. However, as the molecular weight of the polymer increases, typically the hydrocarbon solubility of the polymer decreases, thereby reducing the ability of the polymer to be carried by the hydrocarbon fluid. As a result, heretofore it had been necessary to settle for a compromise between drag reduction effectiveness and solubility, and the degree of drag reduction desired often could not be achieved. Increasing the concentration of the additive in the fluid does compensate for the limited effectiveness of the additive because the limited solubility of the additive is also limited.

Surprisingly, however, it has been found that by forming a salt between the terpolymer of this invention and an oil-soluble polyamine, exceptional drag reducing effectiveness may be achieved without sacrificing oil-solubility. Thus, for example, by contrast to the polymers of U.S. Pat. No. 3,654,994, which have a molecular weight of at least about 1,000,000, the polymers of the present invention have a molecular weight of about 3,000,000 to about 5,000,000 before salt formation with the polyamines, which raises the effective molecular weight even higher. Yet, the salts of this invention typically are sufficiently oil-soluble for use as drag reducing agent. Moreover, the polyamine and terpolymer may be utilized in relatively highly concentrated form, yet do not require special handling techniques or equipment.

The terpolymer may be prepared by emulsion polymerization of styrene, an alkyl acrylate and a carboxylic acid. While the styrene component of the terpolymer increases the molecular weight of the terpolymer, the alkyl acrylate provides improved oil solubility. The styrene includes substituted styrene, specifically t-butyl styrene, as well as unsubstituted styrene.

Generally, it has been found that alkyl acrylates of from about six to about twelve carbon atoms, especially those esters with alkyl groups of less than four carbon atoms, are so polar that their oil solubility is not as high as desired. On the other hand, although oil solubility generally increases with the size of the alkyl group, it has also been found that increasing the size of the alkyl group beyond about twelve carbon atoms does not contribute significantly to solubility. Thus, the alkyl group of the alkyl acrylate should comprise at least about four carbon atoms, and preferably contains from about 4 to about 12 carbon atoms, more preferably from about 6 to about 10 carbon atoms.

The carboxylic acid is acrylic acid or methacrylic acid, preferably acrylic acid. The carboxylic acid is included to increase the molecular weight of the composition by permitting an ionic reaction between the acidic terpolymer and the alkaline polyamine to form a salt. However, because the carboxylic acid tends to decrease the solubility of the terpolymer, less than about 5% by weight based on the total terpolymer, and preferably less than about 1% by weight, of the acid is employed.

Generally, the terpolymer may be prepared by standard emulsion polymerization procedures in a continuously stirred tank reactor. More specifically, the alkyl acrylate and styrene are mixed in an alkyl acrylate to styrene weight ratio of from about 4:1 to about 1:1, preferably from about 7:3 to about 1:1, most preferably about 3:2, with an emulsifying agent, which is generally a surfactant such as a 30% solution of sodium lauryl sulphate, water and a free radical initiator, such as potassium persulphate. The pH of the mixture may be adjusted, such as with sulfuric acid, and the temperature adjusted to about 25° C. At that point, from about one part by weight to about 250 parts by weight, preferably from about one part by weight to about three parts by weight, of the carboxylic acid, i.e., acrylic acid or methacrylic acid, per 1,000 parts by weight styrene is added to the mixture with a second initiator or catalyst, such as ascorbic acid. About half of the carboxylic acid and the catalyst may be added immediately, followed by the remaining half being added a few hours later, together with a small amount more of the catalyst, followed by more initiator and an anionic surfactant.

A slow flow of an inert gas, such as argon gas, may be introduced to the reactor throughout the reaction to maintain a controlled environment. Further reaction may be continued for several more hours, for example, 12 to 20 more hours, until approximately 100% conversion is achieved as measured by solids.

The resulting aqueous emulsion comprises a styrene-/alkyl acrylate/carboxylic acid terpolymer having a molecular weight of about 3,000,000 to about 5,000,000. The terpolymer comprises from about one part by weight to about four parts by weight, preferably about one part by weight to about 2.3 parts by weight., most preferably about 1.5 parts by weight alkyl acrylate, and from about 0.001 part by weight to about 0.25 parts by weight carboxylic acid (most desirably acrylic acid), per part by weight styrene. It has been found that, generally, the effectiveness of the polymer increases with its oil-solubility. Thus, preferred polymers are oil-soluble at concentrations significantly higher than encountered during drag-reducing applications, and generally are not extremely polar such that they tend to "ball-up" physically, but rather tend to be elongate.

It is believed that any oil-soluble polyamine or mixture of oil-soluble polyamines may be used. Preferred polyamines are oil-soluble triamines or oil-soluble polyalkyleneamine mixtures such as Jeffamine T-3000 or T430 (a trade designation of Jefferson Chemical Company, Inc.).

In application, the polymer of this invention is added to the hydrocarbon fluid flowing through a conduit. Any hydrocarbon fuel may be treated, including crude oil and gasoline. Generally, the polymer need not be separated from the emulsion formed during polymerization. In fact, it is preferable that the fluid be treated by addition of the emulsion itself. Thus, in contrast to the commercial drag reduction agents that require significant dilution, such as with kerosene, to improve handling properties, the emulsion of this invention may be added to the fluid directly at full strength.

Superior results with this invention have been noted at a concentration of from about 3 ppm by weight to about 35 ppm by weight (preferably about 15 ppm by weight) of the polymer based on total fluid after addition. Thus, where the emulsion is about 33% by weight active (i.e., 33% by weight of the emulsion is polymer), from about 10 ppm by weight to about 100 ppm by weight (preferably about 50 ppm by weight) of emulsion based on total fluid after addition has been noted to especially effective.

Next, an alcohol, preferably a lower molecular weight alcohol such as iso-propanol may be added to the fuel in about the same weight concentration as the emulsion to break the emulsion. The polyamine is then added to the fluid. Optimally, the polyamine is added in a molar amount equivalent to that of the carboxylic acid of the polymer, but a weight ratio of polymer to polyamine of from about 100:1 to about 10:1 is acceptable. It is understood that the alkaline polyamine combines with the acidic polymer by an ionic reaction to form an oil-soluble salt of higher effective molecular weight than the original polymer. The salt formed thereby has been found to be an especially effective high molecular weight, oil-soluble drag reducing agent.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

EXAMPLE 1

Various emulsion polymers were prepared for use as drag reducers. Styrene (13 gms) and 2-ethylhexyl acrylate (20.77 gms) were placed in a 3-necked flask (300 ml) equipped with a mechanical stirrer and outlet tube, and mixed in the flask with a 30% solution of the sodium lauryl sulphate (10.8 gms), dionized water (54.7) and potassium persulphate (0.063 gms). The mixture was then adjusted carefully to a pH of 7 with 10% sulfuric acid. The flask contents were brought to 25° C., and acrylic acid (0.203 gms) was added, followed by ascorbic acid (0.039 gms). A slow flow of argon gas was used to maintain a controlled environment.

After 3¼ hours, additional acrylic acid (0.203 gms) in sodium lauryl sulphate (0.2 gms) was added, followed by potassium persulphate (0.019 gms) and ascorbic acid (0.029 gms). The reaction was continued for 17 more hours to completion. The conversion was determined to be 100% based on solids. Other polymers were prepared with various alkyl acrylate/styrene/acrylic acid relative proportions, and at either 15° C. or 25° C., as noted in the table below. In these syntheses, the 2-ethylhexyl acrylate (EHA) and styrene (St.) were washed with 5% sodium hydroxide/15% sodium chloride aqueous solution after mixing, and the pH of the ethylhexyl acrylate/styrene emulsion was adjusted to 7 with 1N sulphuric acid before adding acrylic acid.

TABLE I

| Polymer | EHA (Wgt. %) | St. (Wgt. %) | Acrylic Acid (Wgt. %) | Temp. (°C.) |
|---|---|---|---|---|
| 1 | 63.21 | 36.79 | — | 15 |
| 2 | 63.26 | 35.74 | 1.00 | 15 |
| 3 | 62.59 | 36.42 | 0.99 | 15 |
| 4 | 63.14 | 35.67 | 1.19 | 15 |
| 5 | 61.87 | 38.13 | — | 25 |
| 6 | 60.87 | 38.94 | 1.09 | 25 |

EXAMPLE 2

The drag reducing effect of polymers 1-6 alone and in combination with certain polyamines was measured For all tests, 100 ppm by weight of the polymer was mixed with kerosene. Polymers 1 and 5 were dried and dissolved in xylene before being tested in the kerosene. The rest of the polymers were tested by dissolving latexes in kerosene in the presence of the polyamine and isopropanol. Where the polyamine was Demulso-1 (a trade designation of Petrolite Corp. for a triethanolamine/ester mixture), the weight ratio of polymer to polyamine was 100:3. Where the polyamine was Jeffamine T 403., the weight ratio of polymer to polyamine was 100:5. The drag reducing effect was measured as the percentage of drag reduction (% D.R.) achieved over fluid without the additive. The percentage drag reduction was determined by measuring the difference between the pressure drop over a length of pipe for untreated kerosene and the drop over the length of pipe for treated kerosene, and comparing the difference to the pressure drop measured for the untreated kerosene. The results were as follows:

TABLE II

| Drag Reductions of the Polymers at 100 ppm in Kerosene | | |
|---|---|---|
| Polymer | Polyamine | % D.R. |
| 1 | — | 25.9 |
| 2 | Demulso-1 | 30.7 |
| 3 | Demulso-1 | 37.9 |
| 4A | Demulso-1 | 34.6 |
| 4B | Jeffamine T 403 | 38.7 |
| 5 | — | 21 |

TABLE II-continued

| Drag Reductions of the Polymers at 100 ppm in Kerosene | | |
|---|---|---|
| Polymer | Polyamine | % D.R. |
| 6 | Demulso-1 | 19 |

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A salt useful for reducing friction loss in flowing hydrocarbon fluids, said salt being formed by the ionic reaction between an oil-soluble polyamine and a terpolymer of styrene, alkyl acrylate and a carboxylic acid selected from the group consisting of acrylic acid and methacrylic acid.

2. A salt as set forth in claim 1 wherein the alkyl acrylate comprises an alkyl group of at least four carbon atoms.

3. A salt as set forth in claim 2 wherein the alkyl group has from four to about ten carbon atoms.

4. A salt as set forth in claim 3 wherein the alkyl acrylate is ethylhexylacrylate, the carboxylic acid is acrylic acid and the terpolymer is an emulsion polymer having a molecular weight of from about 3,000,000 to about 5,000,000.

5. A salt as set forth in claim 4 wherein the terpolymer comprises from about 1 part by weight to about 4 parts by weight alkyl acrylate per part by weight styrene.

6. A salt as set forth in claim 5 wherein the terpolymer comprises less than about 5% by weight acrylic acid.

7. A salt as set forth in claim 6 wherein the terpolymer comprises less than about 1% by weight acrylic acid.

8. The salt of claim 1 wherein the hydrocarbon fluid is a hydrocarbon fuel.

9. The salt of claim 2 wherein the hydrocarbon fluid is a hydrocarbon fuel.

10. The salt of claim 3 wherein the hydrocarbon fluid is a hydrocarbon fuel.

11. The salt of claim 4 wherein the hydrocarbon fluid is a hydrocarbon fuel.

12. The salt of claim 5 wherein the hydrocarbon fluid is a hydrocarbon fuel.

13. The salt of claim 6 wherein the hydrocarbon fluid is a hydrocarbon fuel.

14. The salt of claim 7 wherein the hydrocarbon fluid is a hydrocarbon fuel.

* * * * *